United States Patent
Guggolz et al.

(10) Patent No.: US 7,691,029 B2
(45) Date of Patent: Apr. 6, 2010

(54) METHOD FOR CONTROLLING A DRIVE TRAIN

(75) Inventors: Manfred Guggolz, Rutensheim (DE); Werner Hillenbrand, Neuffen (DE); Xiayoi Liu, Winneden (DE); Detlef Schnitzer, Denkendorf (DE); Markus Veit, Pliezhausen (DE)

(73) Assignee: Daimler AG, Stuttgart (DE)

( * ) Notice: Subject to any disclaimer, the term of this patent is extended or adjusted under 35 U.S.C. 154(b) by 792 days.

(21) Appl. No.: 10/532,590

(22) PCT Filed: Oct. 22, 2003

(86) PCT No.: PCT/EP03/11691

§ 371 (c)(1), (2), (4) Date: May 11, 2006

(87) PCT Pub. No.: WO2004/037590

PCT Pub. Date: May 6, 2004

(65) Prior Publication Data

US 2006/0211536 A1    Sep. 21, 2006

(30) Foreign Application Priority Data

Oct. 26, 2002    (DE) ................................. 102 49 951

(51) Int. Cl.
*B60W 10/02* (2006.01)

(52) U.S. Cl. .......................... 477/174; 477/77; 477/79; 477/115; 477/906

(58) Field of Classification Search ........................ None
See application file for complete search history.

(56) References Cited

U.S. PATENT DOCUMENTS

| | | | |
|---|---|---|---|
| 5,441,462 A | 8/1995 | Chan | |
| 5,506,771 A * | 4/1996 | Chan et al. | 701/54 |
| 5,533,946 A | 7/1996 | Markyvech | |
| 6,123,643 A | 9/2000 | Davis et al. | |
| 6,544,142 B2 * | 4/2003 | Kobayashi | 477/54 |
| 6,893,378 B2 * | 5/2005 | Janecke et al. | 477/125 |
| 6,997,849 B2 * | 2/2006 | Stasik et al. | 477/78 |
| 2002/0035010 A1 * | 3/2002 | Kobayashi | 477/54 |
| 2003/0054920 A1 * | 3/2003 | Berger et al. | 477/70 |

FOREIGN PATENT DOCUMENTS

EP    0 628 443 B1    12/1994

(Continued)

OTHER PUBLICATIONS

Japanese Office Action dated Nov. 14, 2007 w/English translation (eight (8) pages).

(Continued)

*Primary Examiner*—David D Le
(74) *Attorney, Agent, or Firm*—Crowell & Moring LLP (57) ABSTRACT

A method for operation of a drive train having a drive machine and an automatic, unsynchronized gearwheel variable-speed transmission, which can be connected to the drive machine by using an automatic clutch is described. A control device carries out a selection process as a function of vehicle parameters and/or operating variables of the motor vehicle to determine whether a gear change of the unsynchronized gearwheel variable-speed transmission will be carried out with the clutch engaged or disengaged. To ensure reliable operation of the motor vehicle, a gear change is carried out with the clutch disengaged in a time interval after initial starting up of the drive train and/or after starting of the drive machine and/or when a malfunction is identified in a component in the drive train.

12 Claims, 4 Drawing Sheets

FOREIGN PATENT DOCUMENTS

| | | |
|---|---|---|
| EP | 0 837 784 B1 | 4/1998 |
| EP | 0 837 788 B1 | 4/1998 |
| EP | 1 069 350 B1 | 1/2001 |
| JP | 8-68460 A | 3/1996 |
| JP | 11-351370 A | 12/1999 |
| JP | 2001-280473 A | 10/2001 |
| JP | 2002-39364 A | 2/2002 |
| JP | 2002-130458 A | 5/2002 |
| JP | 2002-257225 A | 9/2002 |
| WO | WO 02060715 A1 * | 8/2002 |

OTHER PUBLICATIONS

Opposition from the European Patent Office dated Dec. 18, 2008 (Eleven 11 pages).

Letter from Orion International Patent Office dated Mar. 30, 2009 (Six 6 pages).

* cited by examiner

METHOD FOR CONTROLLING A DRIVE TRAIN

BRIEF DESCRIPTION AND SUMMARY OF THE INVENTION

This application claims the priority of German patent document 102 49 951.9, filed Oct. 26, 2002 (PCT International Application No. PCT/EP2003/011691, filed Oct. 22, 2003, the disclosure of which is expressly incorporated by reference herein.

The invention relates to a method for operation of a drive train of a motor.

EP 0 695 665 A1 describes a method for operation of a drive train of a motor vehicle which has an automated transmission in the form of an automatic transmission. The transmission can be connected by means of an automatic clutch to a drive machine, in the form of an engine. When a transmission gear change takes place, the clutch is disengaged, and is engaged again once the gear change has been completed. This leads to severe wear on the clutch, particularly when the drive train is used in a commercial vehicle with a large vehicle mass and high drive power levels.

A method for operation of a drive train in a motor vehicle with an automatic transmission is described in EP 0 676 566 A1. The transmission can be connected to a drive machine, in the form of an internal combustion engine, by means of an automatic clutch or a clutch which is operated by foot. In the described method, transmission gear changes are carried out from an original gear to an intended gear with the clutch engaged. The rotation speed of a transmission input shaft is synchronized to the intended rotation speed in the intended gear by controlling the drive machine. When there is need to change up, for example from the vehicle driver, currently recorded vehicle operating conditions are used as the basis to determine whether the demanded upward change can be carried out. Only gear changes which can be carried out are initiated, while demands for gear changes which cannot be carried out are modified or canceled. A large number of gear changes which it would have been possible to carry out with the clutch disengaged are thus not carried out.

A method for operation of a drive train of a motor vehicle is described in WO 02/060715 A1. In this method, whenever a gear change occurs, a decision is made as a function of measured operating variables of the motor vehicle as to whether a clutch is disengaged, or remains engaged, during the gear change. In the case of a gear change with the clutch engaged, the rotation speed of a transmission input shaft is likewise synchronized to the intended rotation speed in the intended gear by controlling the drive machine.

In contrast, the object of the invention is to propose a method for operation of a drive train which allows reliable operation of the drive train.

According to the invention, the object is achieved by a method, in which the control device makes a selection as a function of selection rules and vehicle parameters and variables as to whether the automatic clutch remains engaged or disengaged when a gear change takes place in the gearwheel variable-speed transmission. The method additionally includes that when the gear change is carried out with the clutch engaged, the rotation speed of a transmission input shaft is synchronized to an intended rotation speed in the intended gear by controlling the drive machine. Furthermore, the gear change is carried out exclusively with the clutch disengaged under at least one of two situations: (1) after an initial starting-up of the drive train until all of the vehicle parameters and variables which are relevant for the selection have been determined by the control device, and (2) when a malfunction is identified in a component of the drive train.

A drive train of a motor vehicle has a drive machine, for example in the form of an internal combustion engine, and an automatic gearwheel variable-speed transmission, which can be connected to the drive machine by [means of] an automatic clutch. The clutch may, for example, be in the form of a friction clutch and may be operated by an actuating element. In the case of an automatic gearwheel variable-speed transmission, gear-changing elements can be operated by actuating elements. The gearwheel variable-speed transmission, in particular, is designed in the form of an unsynchronized transmission and may have a front-mounted transmission, for example a split group, and a rear-mounted transmission, for example a range group.

The drive machine has actuating elements which are driven by a control device. By way of example, the control device may preset a fuel injection rate, an ignition time or the use of so-called engine braking, for example in the form of an exhaust valve or a constant throttle. The actuating elements for the gearwheel variable-speed transmission and for the clutch may also be driven by the control device, or by a further control device. The control devices are in this case connected for signaling purposes.

The control device for the gearwheel variable-speed transmission carries out a selection process as a function of selection rules and vehicle parameters and/or operating variables of the motor vehicle, to determine whether the clutch will be disengaged or will remain engaged during a gear change.

When gear changes are carried out from an original gear to an intended gear in the gearwheel variable-speed transmission with the clutch engaged, once the original gear has been deselected, that is to say when there is no longer any connection between an input shaft and an output shaft of the gearwheel variable-speed transmission, the rotation speed of the transmission input shaft is synchronized to the intended rotation speed in the intended gear, the so-called synchronous rotation speed, by controlling the drive machine. At the synchronous rotation speed, gear-changing elements for the intended gear, which are connected firstly to the transmission input shaft and secondly to the transmission output shaft and thus to the driven vehicle wheels, rotate at the same speed. When changing down, the control device for this purpose demands that the drive machine produce a torque by [means of] which the rotation speed of the drive machine, and hence the rotation speed of the transmission input shaft as well, are increased. When changing up, a very low torque or a negative torque, a so-called overrun torque, is demanded, in order to reduce the rotation speed of the transmission input shaft. In order to support this, the engine braking which has been mentioned or further deceleration means which are not part of the drive machine, for example a transmission brake, can also be actuated.

In this case, gear changes may be demanded both by a vehicle driver by a suitable operating device, for example a gear-changing lever, or by the control device for the gearwheel variable-speed transmission.

Gear changes can also be carried out with the clutch disengaged. When the clutch is disengaged, no torque can be transmitted from the transmission input shaft to the transmission output shaft. There is no need for an operating movement of the clutch to have been carried out completely for this purpose.

Every gear change can thus be carried out with a clutch state that is suitable for the operating conditions of the motor vehicle. This ensures reliable operation of the drive train, during which demanded gear changes for the gearwheel variable-speed transmission are carried out reliably. At the same time, this allows low clutch wear and thus low-cost operation of the motor vehicle.

Furthermore, when the clutch is disengaged, gear changes are thus possible for which the rotation speed of the drive machine in the intended gear is less than the so-called stationary idling speed, that is to say the rotation speed which occurs when the vehicle is idling at rest, without any action by the vehicle driver. This may be advantageous, for example, before entering a steep upward gradient or a steep downward gradient.

According to the invention, gear changes are carried out with the clutch disengaged in a time interval after initial starting-up of the drive train and/or after starting of the drive machine and/or when a malfunction of a component in the drive train has been identified. After initial starting-up of the drive train and/or after starting of the drive machine, in particular, upward gear changes are carried out with the clutch disengaged.

Initial starting-up in this case means the starting up of the drive train after the manufacture of the motor vehicle, or starting up after replacement of an element, for example of the drive machine, of the drive train. The time interval may in this case be predetermined to be fixed, or may be ended after a number of conditions are satisfied.

On initial starting-up or after starting of the drive machine, the vehicle parameters which are taken into account in the selection process and the test which have been mentioned are not all known. For example, on starting up for the first time, the profile parameters of the rotation speed of the drive machine may be unknown. These can then be measured and can be stored in a control device. (After engine starting, for example, the vehicle weight may have changed to a very great extent as a result of a change in the load. This applies in particular to commercial vehicles, in which the load may be far greater than the empty weight of the vehicle.)

One condition for ending the time interval which has been mentioned may, for example, be that all of the vehicle parameters that are relevant for the selection process are defined. While the vehicle parameters are undefined, it is impossible to carry out a reliable selection process. Safe operation of the motor vehicle is thus ensured in this phase by changing gear with the clutch disengaged.

In the event of a malfunction of a component in the drive train being identified, gear changes are likewise carried out with the clutch disengaged. For example, the control device for the drive machine may have identified a defect and can subsequently ensure only emergency operation of the drive machine. Furthermore, for example, an engine brake may be so difficult to operate that the operation of the engine brake is no longer possible, or is possible only to a very restricted extent.

The behavior of the faulty component during a gear change is thus no longer predictable. It is thus impossible to carry out a safe test and selection process. When a malfunction of a component has been identified, safe operation of the motor vehicle is thus ensured by changing gear with the clutch disengaged.

In a refinement of the invention, the control device carries out a test as a function of test rules to determine whether a demanded gear change can be carried out with the clutch engaged. The selection process to determine whether the clutch is disengaged or remains engaged for the gear change depends on the result of the test. In particular, all of the gear changes which are possible with the clutch engaged are also carried out in this way. This results in as many gear changes as possible being carried out with the clutch engaged, which leads to particularly low clutch wear.

In a refinement of the invention, the test can be carried out as a function of vehicle parameters and/or operating parameters of the motor vehicle. Vehicle parameters of the motor vehicle describe the general state of the motor vehicle, for example:
the vehicle weight,
the air drag coefficient and an end surface area,
rolling resistance coefficients of the vehicle tires,
profile parameters for the rotation speed of the drive machine for synchronization during a gear change, for example a maximum positive and negative gradient, or
a general state of the engine braking, for example easily operable or difficult to operate.

Operating variables describe the state of the motor vehicle at a specific time, for example when a gear change is demanded. Operating variables are, for example:
the rotation speed of the drive machine,
the torque of the drive machine,
the position of a power demand element, for example of a gas pedal,
the state of the engine braking, for example active or inactive,
the original gear.

The vehicle parameters and the operating variables may in some cases be detected directly by sensors, and in particular operating situations may be measured or may be determined from measured variables by suitable calculation methods.

The behavior of the motor vehicle, for example the profile of the vehicle speed or the rotation speed of the drive machine, during a gear change can thus be determined in advance, in particular for the time interval in which the drive machine is not connected to the vehicle wheels. The test as to whether a gear change can be carried out with the clutch engaged can be carried out accurately by taking account of these variables. The risk of the test producing an incorrect result is thus low.

During the selection process as to whether a gear change can be carried out with the clutch disengaged or engaged thus ensures whether the demanded gear change can be carried out.

In a refinement of the invention, the selection process and/or the test are/is carried out at least in some operating areas as a function of the intended gear of the gearwheel variable-speed transmission.

The risk of the test as to whether a gear change can be carried out with the clutch engaged giving incorrect results is thus particularly low.

For example, when changing up, the rotation speed of the drive machine and thus the rotation speed of the transmission input shaft are decelerated in the direction of the synchronous rotation speed by the braking torque applied by the drive machine. The braking torque is built up by injecting only a small amount of fuel, or no fuel. In addition, the braking torque can be increased by the use of engine braking. The synchronous rotation speed results from the speed of the motor vehicle and the intended gear taking into account any further transmission ratio, for example of a rear axle, in the drive train. The synchronous rotation speed thus changes as the vehicle speed changes. In order to reach the synchronous rotation speed, the gradient of the rotation speed of the drive machine must therefore be considerably greater than the gradient of the synchronous rotation speed. The risk of this not being the case occurs in particular when the vehicle is heavy and thus with a major deceleration of the vehicle with the gear deselected, that is to say without any drive torque. In a test to determine whether the gear change can be carried out with the clutch disengaged, any deceleration of the motor vehicle, which is governed by the vehicle mass, is compared with the maximum negative gradient of the rotation speed of the drive machine as a function of the stated vehicle parameters and/or operating variables. This makes it possible to calculate accurately in advance whether the synchronous rotation speed which is dependent on the intended gear can be reached, and thus whether the gear change can be carried out with the clutch engaged.

In a refinement of the invention, the selection process and/or the test are carried out at least in some operating areas as a function of variables which describe the environment of the motor vehicle. These variables are, for example:

the inclination of the roadway,
the condition of the roadway, for example tarmac road, gravel or mud,
ambient temperature,
the geodetic height, or
the ambient pressure.

Some of these variables can be detected directly by [means of] sensors, can be measured in special operating situations, or can be determined by suitable calculation methods. Some variables, such as the inclination of the roadway, can also be obtained from a navigation system, which is known per se, with a digital road map.

The prior calculation of the behavior of the motor vehicle when a gear change takes place, and thus also the test which has been mentioned can thus be carried out particularly accurately.

In one refinement of the invention, the vehicle parameters are variable. The vehicle parameters can be determined in selected operating areas of the motor vehicle, and can be compared with stored parameters. In the event of any discrepancies, new parameter values can be calculated and stored, that is to say a so-called adaptation process can be carried out. The newly stored parameter values are then taken into account in the selection process and in the test.

Parameters which can change very quickly may be adapted, for example the vehicle weight. Furthermore, parameters can be adapted which cannot be defined exactly before or during initial starting up, such as profile parameters for the rotation speed of the drive machine. The profile parameters, for example the maximum gradients of the rotation speed, differ from one drive machine to another, and can also change over a lengthy time period, as well. For safety reasons, poor values must therefore be assumed as initial values for the adaptation process, for example only small possible gradients of the rotation speed of the drive machine. The test can thus incorrectly give the result that a demanded gear change cannot be carried out with the clutch engaged even though this would be possible with the actual vehicle parameters. The adaptation process results in the stored values approaching the actual values evermore closely, so that an ever greater number of gear changes can be carried out with the clutch engaged.

This allows particularly low-wear operation of the motor vehicle.

In one refinement of the invention, the gearwheel variable-speed transmission has a synchronization device which can be actuated by the control device, and by which a transmission input shaft can be braked, and the control device selects, while changing up with the clutch disengaged, whether the synchronization device will be actuated and thus whether the transmission input shaft will be braked, or whether no such actuation will take place. The synchronization device may, for example, be in the form of a transmission brake, which is known per se and acts directly on the transmission input shaft or on a lay shaft.

This ensures that the transmission input shaft reaches the synchronous rotation speed of the intended gear reliably and quickly when changing up with the clutch disengaged, even when the vehicle speed is varying to a major extent. It is thus possible to change up quickly, ensuring reliable operation of the motor vehicle.

In one refinement of the invention, the clutch remains engaged at the start of changing down, and the control device drives an actuating element in order to deselect the original gear. The control device then determines a time since the actuating element was driven, and monitors whether the original gear has been deselected. If this the case, then the gear change is carried out with the clutch engaged. If the time determined since the actuating element was driven exceeds a threshold without the original gear having been deselected, the control device disengages the clutch, and the gear change is carried out with the clutch disengaged.

In order to make it possible to deselect a gear no torque, or only a very small amount of torque, may be transmitted by the associated gear-changing elements, for example a sliding collar. This can be achieved on the one hand by the clutch being disengaged or, when the clutch is engaged, by deliberately varying the torque emitted from the drive machine. When the motor vehicle is in the traction mode, then the torque must be reduced; in the overrun mode, the torque must be increased. If the vehicle speed changes at the time of the desired deselection, then the drive machine must set the said state on the gear-changing element of the original gear counter to the forced change in the rotation speed of the transmission output shaft and input shaft. This is only possible when the dynamics of the drive machine are greater than the dynamics of the motor vehicle. For example, major vehicle deceleration with a downward gear change being demanded at the same time is particularly critical in this context.

The method according to the invention allows even gear changes which are demanded in critical situations to be carried out reliably. Furthermore, no detailed knowledge of the vehicle parameters, of the operating variables or of the environmental variables is required for as large a proportion as possible of gear changes with the clutch engaged. Low-wear and reliable operation of the motor vehicle can thus be ensured if it has not been possible to determine the stated variables, or if the stated variables have not been determined yet.

Further advantages of the invention will become evident from the description and from the drawing. Exemplary embodiments of the invention are illustrated in a simplified form in the drawing and will be explained in more detail in the following description. In the drawing:

DETAILED DESCRIPTION OF THE DRAWINGS

Figure 1:
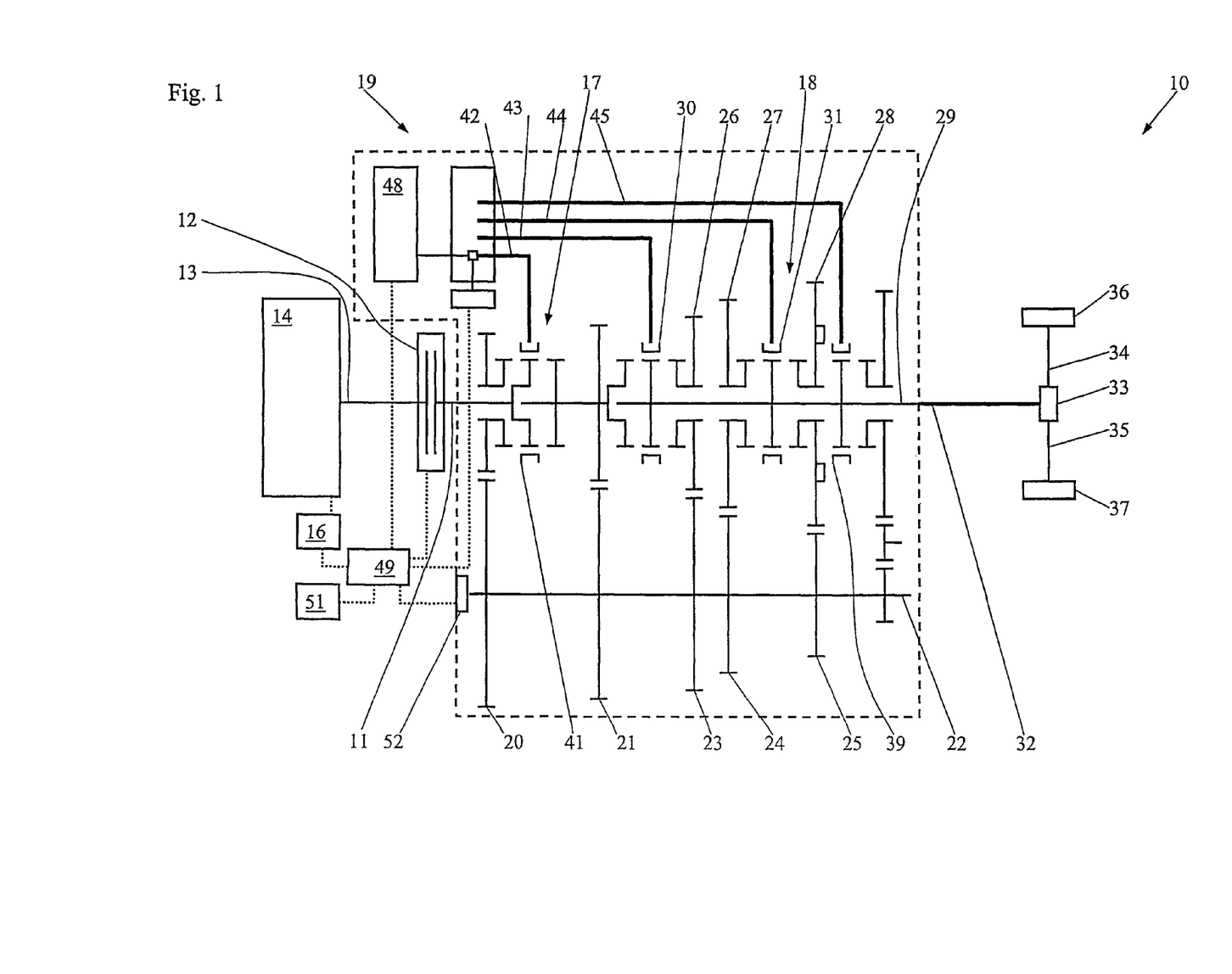
FIG. 1 shows a drive train of a motor vehicle with an automatic gearwheel variable-speed transmission, illustrated schematically.

As is shown in FIG. 1, a drive train 10 of a motor vehicle (which is not illustrated) has a drive machine 14 which is driven by a control device 16. The control device 16 is connected, for signaling purposes, to actuating elements which are not illustrated, for example for an exhaust valve (which is not illustrated) of the drive machine 14. The control device 16 can thus send manipulated variables to the actuating elements for the drive machine 14. Furthermore, the control device 16 is connected for signaling purposes to sensors (which are not illustrated), such as a rotation speed sensor or a temperature sensor, by which operating variables of the drive machine 14 can be detected.

The drive machine 14 can be connected by [means of] an output shaft 13 and a friction clutch 12 to an input shaft 11, which is arranged coaxially with respect to the output shaft 13, of an automatic, unsynchronized gearwheel variable-speed transmission 19, a so-called dog-clutch transmission. The clutch 12 and the gearwheel variable-speed transmission 19 are driven by a control device 49. The control device 49 is connected for signaling purposes to actuating elements (which are not illustrated) and sensors for the clutch 12 and for the gearwheel variable-speed transmission 19. The control device 49 can thus engage or disengage the clutch 12, and can carry out the gear change in the gearwheel variable-speed transmission 19. The sensors can be used to detect operating variables such as rotation speeds or temperatures of the clutch 12 and of the gearwheel variable-speed transmission 19. Furthermore, the control device 49 is connected for signaling purposes to the control device 16, thus allowing data to be interchanged, for example operating variables for the drive machine 14 or for the gearwheel variable-speed transmission 19, as well as a demand for rotation speed changes of the drive machine 14, which are then implemented by the control device 16. The control device 49 is also connected to a control unit 51, by which a vehicle driver can demand that the gearwheel variable-speed transmission 19 changes gear. As an alternative to this, gear changes from an original gear to an intended gear can also be initiated in a manner known per se by the control device 49. The determination of the intended gear in this case depends, inter alia, on the speed of the motor vehicle and on the extent to which the vehicle driver has operated a gas pedal.

The gearwheel variable-speed transmission 19 is in the form of a so-called two-group transmission. A front-mounted transmission in the form of a split group 17 is arranged connected to the transmission input shaft 11, such that they rotate together. The split group 17 is followed by a main transmission 18.

The split group 17 allows the transmission input shaft 11 to be operatively connected via two different gearwheel pairs 20, 21 to a lay shaft 22, which is arranged parallel to the transmission input shaft 11. The gearwheel pairs 20, 21 have a different transmission ratio. Fixed wheels 23, 24, 25 for the third, second and first gear of the main transmission 18 are arranged on the lay shaft 22. The fixed wheels 23, 24, 25 engage with respectively associated loose wheels 26, 27, 28, which are arranged on a main shaft 29 (which is arranged coaxially with respect to the transmission input shaft 11) such that they can rotate. The loose wheel 26 can be connected in a rotationally fixed manner and in an interlocking manner to the main shaft 29 by [means of] a sliding collar 30, and the loose wheels 27 and 28 can be connected in the same way to the main shaft 29 by a sliding collar 31.

A synchronization device in the form of a transmission brake 52, which can be actuated by the control device 49, is arranged on the lay shaft 22. The rotation speed of the lay shaft 22, and hence also the rotation speed of the transmission input shaft 11, can be reduced deliberately by the transmission brake 52.

A sliding collar 41 for the split group 17 and the sliding collars 30, 31, 39 for the main transmission 18 can respectively be operated by gear-changing rods 42, 43, 44, 45. This allows an interlocking connection to be produced or interrupted between associated gear-changing elements and the main shaft 29. The gear-changing rods 42, 43, 44, 45 can be operated by an actuating element in the form of a gear-changing actuator 48, which is actuated by the control device 49. When no gear is selected in the gearwheel variable-speed transmission 19, that is to say no loose wheel is connected in an interlocking manner to the main shaft 29, than the gearwheel variable-speed transmission 19 is in a so-called neutral position.

The torque that is modulated and the rotation speed of the drive machine 40 are transmitted from the main shaft 29 by a drive shaft 32 to an axle transmission 33 which, in a manner known per se, transmits the rotation speed in identical or different components via two output drive shafts 34, 35 to the drive wheels 36, 37.

When a gear change takes place from an original gear to an intended gear, the original gear must first of all be deselected. Since the gearwheel variable-speed transmission 19 is in the form of an unsynchronized transmission, in order to make it possible to select the intended gear at least during changing-down operations, the lay shaft 22 and thus also the input shaft 11 must be set approximately to the synchronous rotation speed of the intended gear by the drive machine 14 with the clutch 12 engaged. The synchronous rotation speed is reached when the loose wheel of the intended gear and the main shaft 29 are rotating at the same speed. During changing-up operations with the clutch 12 disengaged, the lay shaft 22 can be braked by [means of] the transmission brake 52, and can thus be synchronized to the input shaft 11.

The deselection of the original gear can be carried out with the clutch either engaged or disengaged. In this case, frequent engaging and disengaging of the clutch 12 leads to severe wear and thus to high costs for replacement of the clutch and unavailability of the motor vehicle while it is being replaced. The aim is therefore to carry out as high a proportion of gear changes as possible with the clutch engaged.

Figure 2:
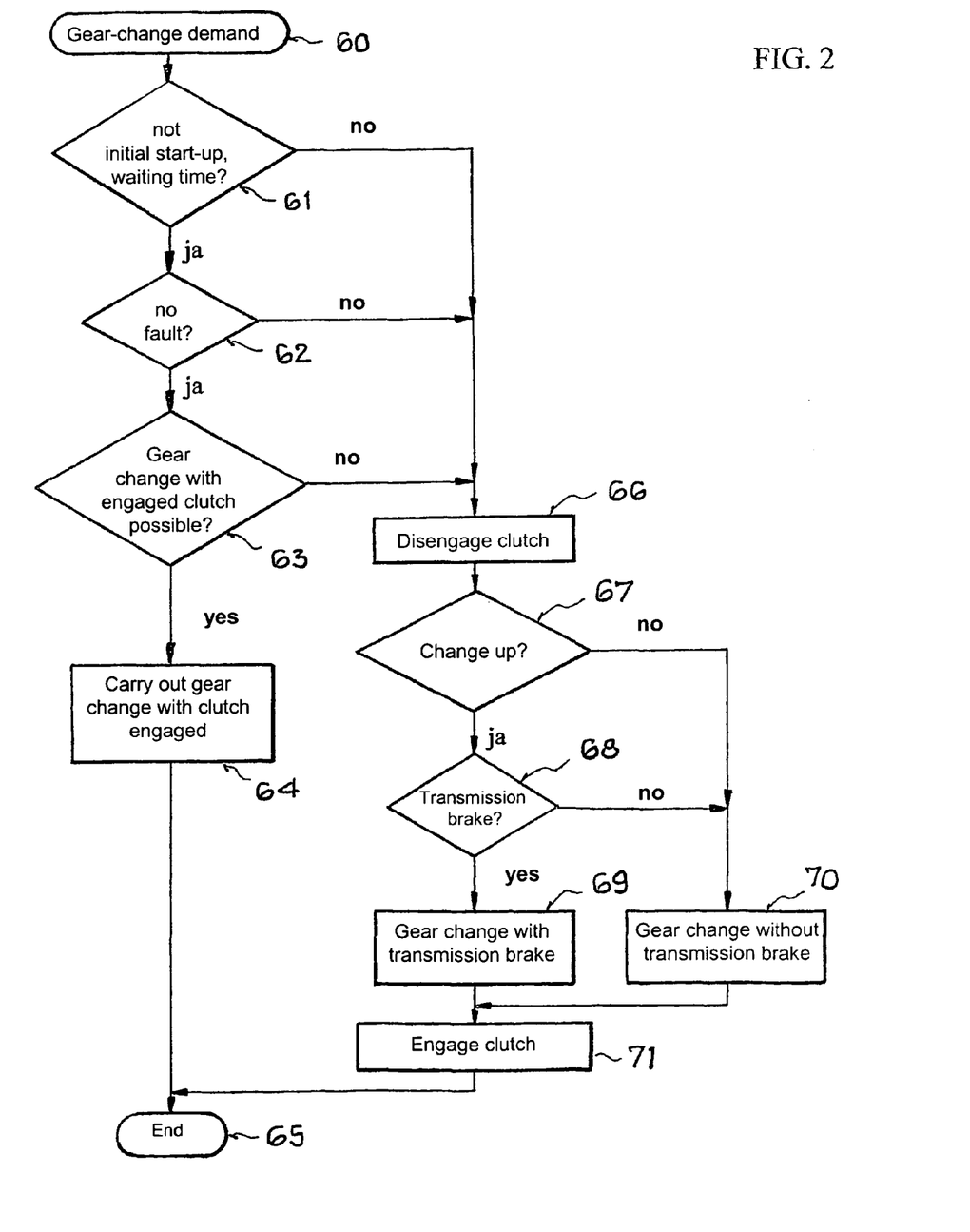
FIG. 2 shows a flowchart of a gear change.

As is illustrated in the flowchart in FIG. 2, a gear change demand (block 60) is followed in the next block 61 by the control device 49 testing whether the drive train 10 is being started up for the first time and whether a time interval has elapsed since the starting of the drive machine 14. If the test is positive, then a test is carried out in the block 62 to determine whether any malfunctions have been identified in any component of the drive train 10. For this purpose, information is evaluated from another control device, for example the control device 16, or from other program parts of a control program for the control device 49, which monitor functions of components. If the test result is positive, that is to say no fault is present, then a test is carried out on the block 63 to determine whether the gear change can be carried out with the clutch 12 engaged. For this purpose, the profile of the rotation speed of the transmission input shaft 11 during the demanded gear change operation is calculated in advance on the basis of the known vehicle parameters, the operating variables of the motor vehicle and the environmental variables, by [means of]

equations of motion which are known per se. The profile which has been calculated in advance is then compared with the stored maximum gradients for the rotation speed of the drive machine 14, and a decision is made as to whether, on the one hand, the original gear can be deselected and, on the other hand, whether it is possible to synchronize the rotation speed of the transmission input shaft 11 to the synchronous rotation speed for the intended gear. If the test result is positive, then the gear-changing operation is carried out in the block 64, in a manner known per se with the clutch 12 engaged. For this purpose, the torque which is emitted from the drive machine 14 is changed by the control device 16 in order to reduce the torque transmitted to the gear-changing elements for the original gear to such an extent that the original gear can be deselected. Synchronization then takes place by [means of] the drive machine 14. As soon as the rotation speed of the transmission input shaft 11 has approximately reached the synchronous rotation speed for the intended gear, the intended gear is selected. The drive machine 14 is then once again set to the torque which the vehicle driver has preset by [means of] a gas pedal, which is not illustrated. The gear-changing operation is thus completed in the block 65.

If the result of the test in one of the blocks 61, 62, 63 is negative, that is to say starting up is taking place for the first time or a time threshold after starting of the drive machine 14 has not yet been reached, or if a malfunction has been found in a component of the drive train 10, or the gear change cannot be carried out with the clutch 12 engaged, then the clutch 12 is disengaged in the block 66, by being actuated by the control device 49. A test is then carried out in the block 67 to determine whether a changing-up operation is intended to be carried out. If this is the case, then a test is carried out in the block 68 on the basis of profiles which have been calculated in advance in the block 63 to determine whether the transmission brake 52 should be activated, and thus whether the lay shaft 22 and hence also the transmission input shaft 11 should be actively braked. If the test result is positive, then the gear-changing operation is carried out in a manner known per se in the block 69, with the transmission brake 52 being activated. For this purpose, the original gear is deselected, the synchronization process is carried out assisted by the transmission brake 52, and the intended gear is then selected.

If the result of the test in the block 67 or 68 is negative, that is to say a changing-down operation or a changing-up operation is intended to be carried out without activation of the transmission brake 52, then the gear change is carried out in the block 70, in a manner known per se, without activation of the transmission brake 52.

After the blocks 69 or 70, that is to say when the intended gear has been selected, the clutch 12 is engaged again in the block 71, and the torque predetermined by the vehicle driver is once again selected on the drive machine 14. The gear-changing operation is thus likewise completed in the block 65.

The method can also be carried out without the blocks 61 and/or 62.

This results in a method for controlling a drive train of a motor vehicle, in which the drive train 10 has a drive machine 14, an automatic gearwheel variable-speed transmission 19, an automatic clutch 12 which is arranged between the drive machine 14 and the gearwheel variable-speed transmission 19, and at least one control device 49, and gear changes from an original gear to an intended gear of the gearwheel variable-speed transmission 19 are carried out with the clutch 12 engaged, with the rotation speed of a transmission input shaft 11 being synchronized to the intended rotation speed in the intended gear by controlling the drive machine 14, characterized in that the gearwheel variable-speed transmission 19 has a synchronization device (transmission brake 52) which can be driven by the control device 49 and by which a transmission input shaft 11 can be braked, and, when changing up with the clutch 12 disengaged, the control device 49 selects whether the synchronization device (transmission brake 52) will be driven, with the transmission input shaft 11 thus being braked, or whether it will not be driven.

Figure 3A:
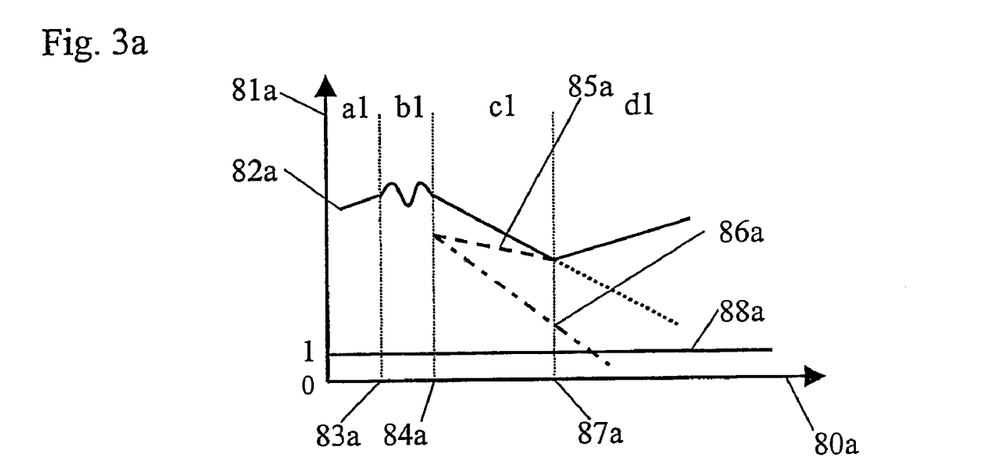
FIGS. 3a, 3b each show a diagram to illustrate the timing of the operating variables of the motor vehicle while the gearwheel variable-speed transmission is changing up.
Figure 3B:
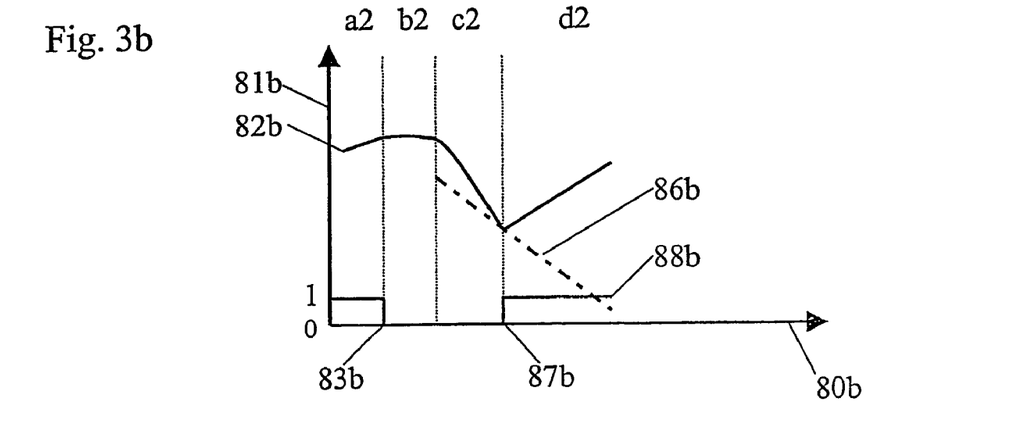

FIGS. 3a and 3b show the time profile of operating variables of the motor vehicle while the gearwheel variable-speed transmission 19 is being changed up from an original gear to an intended gear. The capability to carry out changing-up operations with the clutch engaged will be explained in more detail with reference to these profiles.

In FIGS. 3a and 3b, time is plotted on the abscissas 80a, 80b, and the rotation speed or the clutch status is plotted on the ordinates 81a, 81b.

The original gear is still selected in a phase al in FIG. 3a. The drive machine 14 is emitting a constant torque, and the motor vehicle is being accelerated, so that the rotation speed of the drive machine 14 (line 82a) is rising. At the time 83a, the vehicle driver uses the control unit 51 to demand a changing-up operation. In the phase b1, the drive machine 14 reduces the emitted torque (not illustrated) in order that the original gear can be deselected. This results in a fluctuation in the rotation speed of the drive machine 14 in the phase b1. The original gear is deselected at the time 84a at the end of the phase b1, and the gearwheel variable-speed transmission 19 is thus in a neutral position. The rotation speed of the drive machine 14 falls in the phase c1 owing to the engine braking effect.

As described, the synchronous rotation speed for the intended gear is proportional to the speed of the motor vehicle. The lines 85a and 86a show the profile of the synchronous rotation speed in two different situations. In the first situation (line 85a), the synchronous rotation speed falls only slowly. This may be due, for example, to the fact that the roadway is slightly downward sloping. The rotation speed of the drive machine 14 reaches the synchronous rotation speed (at which the lines 82a and 85a meet) at the time 87a. The intended gear can thus be selected, and the torque demanded by the vehicle driver can be selected. The gear-changing operation is thus complete, and the motor vehicle is accelerated again, with the rotation speed of the drive machine 14 rising again in the phase d1. In this case, the clutch 12 remains engaged throughout the entire gear-changing process (line 88a, state 1).

In the second situation (line 86a), the synchronous rotation speed falls very sharply. This may be due to the fact, for example, that the roadway is rising and/or the vehicle is heavily loaded and/or the roadway surface is very soft. The synchronous rotation speed falls more quickly than the rotation speed of the drive machine 14. The rotation speed of the drive machine 14 can thus not reach the synchronous rotation speed, and the intended gear cannot be selected. The gear-changing operation can thus not be carried out with the clutch 12 engaged.

During the test as to whether the gear-changing operation can be carried out with the clutch 12 engaged (block 63 in FIG. 2), these profiles of the rotation speeds are calculated in advance and are tested to determine whether the rotation speed of the drive machine 14 will or will not reach the synchronous rotation speed. If this is not the case, the gear-changing operation cannot be carried out with the clutch 12 engaged.

The second situation is illustrated once again in FIG. 3b, with the difference that the clutch 12 is disengaged for the illustrated gear change. The clutch 12 is engaged in the phase a2 (state 1, line 88b). When the gear-change demand occurs (time 83b), the profile of the rotation speeds is calculated in advance and the decision is made that the gear-changing operation can be carried out only with the clutch 12 disengaged. In consequence, the clutch 12 is disengaged immediately (state 0). In the phase b2, the original gear is deselected, and in the phase c2 the rotation speed of the drive machine 14 is braked (line 82b) by the transmission brake 52. The rotation speed of the drive machine 14 thus reaches the synchronous rotation speed at the time 87b, the intended gear can be selected, and the clutch 12 can be engaged. The gear-changing process is thus complete, and the motor vehicle is accelerated again in the phase d2. The gear-changing operation can thus be carried out with the clutch disengaged.

Figure 4:
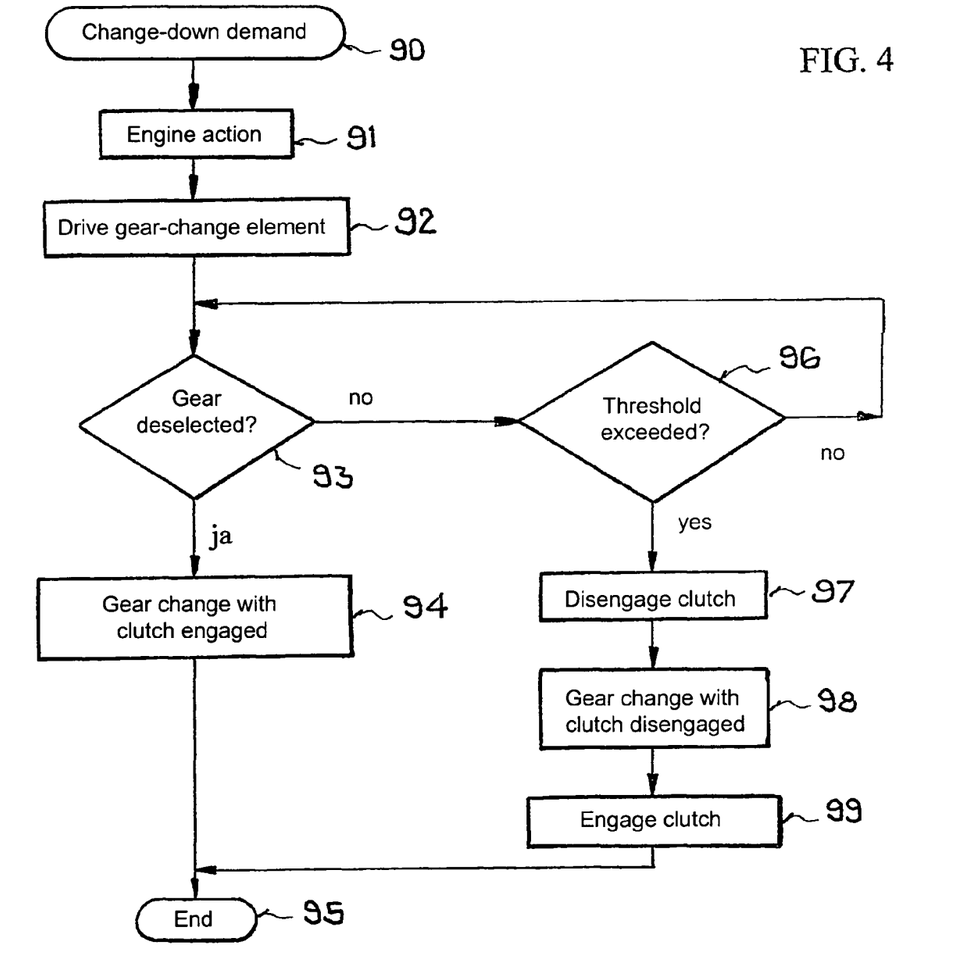
FIG. 4 shows a flowchart for changing down, in a second embodiment.

FIG. 4 shows a flow chart for changing down, according to a second embodiment. After a change-down demand (block 90), the torque emitted from the drive machine 14 is changed in the block 91 as for a gear-changing operation with the clutch 12 engaged, so that the original gear should be able to be deselected. In the following block 92, the gear-changing actuator 48 is actuated in order to deselect the original gear. A test is then carried out in the block 93 to determine whether the original gear has been deselected. If this is the case, the gear-changing process is carried out in the block 94 with the clutch engaged, and the changing-down process is ended in the block 95. If the result of the test in the block 93 is negative, that is to say the original gear has not been deselected, a test is carried out in the block 96 to determine whether the time since the actuation of the gear-changing actuator 48 has exceeded a threshold. If this is not the case, then the block 93 is repeated. If the threshold in the block 96 has been exceeded, then the clutch is disengaged in the block 97, the gear-changing operation is carried out with the clutch disengaged in the block 98 and the clutch is engaged again in the block 99. The gear-changing operation is thus likewise complete in the block 95.

The time threshold which has been mentioned in the block 96 may in this case be dependent on vehicle parameters of the motor vehicle, for example the vehicle weight, and/or operating variables of the motor vehicle, for example the rotation speed of the drive machine 14, and/or on variables which describe the environment of the motor vehicle, for example the inclination of the roadway.

The method as illustrated in FIG. 4 is carried out when the gear change is intended to be carried out with the clutch engaged.

It is also possible to carry out the method irrespective of whether this involves starting-up for the first time and/or starting of the drive machine and/or an identified malfunction. This results in a method for controlling a drive train of a motor vehicle, with the drive train 10 having a drive machine 14, an automatic gearwheel variable-speed transmission 19, an automatic clutch 12 which is arranged between the drive machine 14 and the gearwheel variable-speed transmission 19, and at least one control device 49, and with gear changes being carried out from an original gear to an intended gear of the gearwheel variable-speed transmission 19 with the clutch 12 engaged, with the rotation speed of a transmission input shaft 11 being synchronized to the intended rotation speed in the intended gear by controlling the drive machine 14, characterized in that the clutch 12 remains engaged at the start of changing-down operations, and the control device 49 actuates an actuating element (gear-changing actuator 48) in order to deselect the original gear, determines a time since the actuation of the actuating element (gear-changing actuator 48) and monitors whether the original gear has been deselected, and if the determined time exceeds a threshold without the original gear having been deselected, the clutch 12 is disengaged.

The threshold which has been mentioned may be dependent on vehicle parameters of the motor vehicle, and/or operating variables of the motor vehicle and/or on variables which describe the environment of the motor vehicle.

The invention claimed is:

1. A method for controlling a drive train for a motor vehicle, the drive train including a drive machine, an automatic gearwheel variable-speed transmission, an automatic clutch arranged between the drive machine and the gearwheel variable-speed transmission, and a control device, the method comprising:
   the control device making a selection as a function of selection rules and vehicle parameters and variables as to whether the automatic clutch remains engaged or disengaged when a gear change takes place from an original gear to an intended gear in the gearwheel variable-speed transmission;
   when the gear change is carried out with the clutch engaged, synchronizing a rotation speed of a transmission input shaft to an intended rotation speed in the intended gear by controlling the drive machine;
   carrying out the gear change exclusively with the clutch disengaged
   when a malfunction exists in a component of the drive train.

2. The method as claimed in claim 1, wherein the vehicle parameters vary.

3. The method as claimed in claim 1, wherein the gearwheel variable-speed transmission has a synchronization device which is driven by the control device and which is used to brake a transmission input shaft, and wherein in an upshift gear change with the automatic clutch disengaged, the control device selects whether the synchronization device is used to brake the transmission input shaft.

4. The method according to claim 1, further comprising:
   carrying out the gear change exclusively with the clutch disengaged when the gear change occurs during a time interval which commences upon an initial starting-up of the drive train and continues until all of the vehicle parameters and variables which are relevant for the selection have been determined by the control device.

5. The method as claimed in claim 1, further comprising:
   the control device carrying out a test to determine whether the gear change can be carried out with the clutch engaged; and
   making the selection based on a result of the test.

6. The method as claimed in claim 5, further comprising carrying out the test as a function of the intended gear for the gearwheel variable-speed transmission.

7. The method as claimed in claim 5, further comprising carrying out at least one of the selection and the test in some operating areas as a function of variables which describe at least one of a roadway inclination, a roadway condition, an ambient temperature, a geodetic height and an ambient pressure.

8. The method as claimed in claim 5, further comprising carrying out the test as a function of vehicle parameters and variables.

9. The method as claimed in claim 8, further comprising carrying out at least one of the selection and the test in some operating areas as a function of the intended gear for the gearwheel variable-speed transmission.

10. The method as claimed in claim 9, further comprising carrying out at least one of the selection and the test in some operating areas as a function of variables which describe an environment of the motor vehicle.

11. The method as claimed in claim 1, wherein at the start of a downshift gear change, the clutch remains engaged, and the control device drives an actuating element to deselect the original gear,
determines a time since the driving of the actuating element,
monitors whether the original gear has been deselected, and
if the determined time exceeds a threshold without the original gear having been deselected, disengages the clutch.

12. The method as claimed in claim 11, wherein the stated threshold is dependent on at least one of vehicle parameters, vehicle variables, and variables which describe an environment of the motor vehicle.

* * * * *